United States Patent
Herman et al.

(10) Patent No.: US 10,745,005 B2
(45) Date of Patent: Aug. 18, 2020

(54) INTER-VEHICLE COOPERATION FOR VEHICLE SELF HEIGHT ESTIMATION

(71) Applicant: Ford Global Technologies, LLC, Dearborn, MI (US)

(72) Inventors: David Michael Herman, Southfield, MI (US); David A. Herman, Southfield, MI (US); David Joseph Orris, Southgate, MI (US); Nunzio DeCia, Northville, MI (US); Stephen Jay Orris, Jr., New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 362 days.

(21) Appl. No.: 15/879,151

(22) Filed: Jan. 24, 2018

(65) Prior Publication Data

US 2019/0225210 A1     Jul. 25, 2019

(51) Int. Cl.
*B60W 30/09*     (2012.01)
*G06K 9/00*      (2006.01)
(Continued)

(52) U.S. Cl.
CPC ............. *B60W 30/09* (2013.01); *B60R 16/02* (2013.01); *G06K 9/00201* (2013.01);
(Continued)

(58) Field of Classification Search
CPC ............. B60W 30/09; B60W 2554/00; B60W 2420/42; B60W 2530/00; G06T 7/50;
(Continued)

(56) References Cited

U.S. PATENT DOCUMENTS 5,617,490 A    4/1997  Kume
5,717,390 A    2/1998  Hasselbring
(Continued)

FOREIGN PATENT DOCUMENTS

CN    106683139 A    5/2017
CN    107226087 A   10/2017
(Continued)

OTHER PUBLICATIONS

Mitra, Niloy J. et al., "Estimating Surface Normals in Noisy Point Cloud Data," International Journal of Computational Geometry & Applications, pp. 261-276, vol. 14, 2004, 16 pages.
(Continued)

*Primary Examiner* — Russell Frejd
(74) *Attorney, Agent, or Firm* — Frank Lollo; Eversheds Sutherland (US) LLP

(57) ABSTRACT

Method and apparatus are disclosed for inter-vehicle cooperation for vehicle self height estimation. An example vehicle includes an inter-vehicle communication module and a body control module. The body control module broadcasts a request for images via the inter-vehicle communication module. The body control module also performs semantic segmentation on the images, generates a composite image of the vehicle based on the segmented images, and generates a three dimensional representation of the vehicle based on the composite image. Using the three dimensional representation, the body control module determines a height of the vehicle, and based on the height, controls the vehicle to avoid obstacles.

16 Claims, 4 Drawing Sheets

(51) Int. Cl.
G06T 17/00 (2006.01)
G06T 7/50 (2017.01)
H04W 4/40 (2018.01)
H04W 4/46 (2018.01)
G06T 7/55 (2017.01)
G08G 1/16 (2006.01)
B60R 16/02 (2006.01)
H04W 4/06 (2009.01)
G06T 7/60 (2017.01)
H04W 4/02 (2018.01)
G06T 17/05 (2011.01)

(52) U.S. Cl.
CPC ............ G06K 9/00805 (2013.01); G06T 7/50 (2017.01); G06T 7/55 (2017.01); G06T 7/60 (2013.01); G06T 17/00 (2013.01); G08G 1/161 (2013.01); G08G 1/165 (2013.01); H04W 4/025 (2013.01); H04W 4/06 (2013.01); H04W 4/40 (2018.02); H04W 4/46 (2018.02); B60W 2420/42 (2013.01); B60W 2530/00 (2013.01); B60W 2554/00 (2020.02); G06K 2209/40 (2013.01); G06T 17/05 (2013.01); G06T 2207/30261 (2013.01)

(58) Field of Classification Search
CPC ............ G06T 17/00; G06T 17/05; G06T 7/55; G06T 2207/30261; G06T 7/60; G06K 9/00805; G06K 2209/40; G06K 9/00201; B60R 16/02; H04W 4/025; H04W 4/46; H04W 4/40; H04W 4/06; G08G 1/165; G08G 1/161
See application file for complete search history.

(56) References Cited

U.S. PATENT DOCUMENTS

| | | |
|---|---|---|
| 6,587,597 B1 | 7/2003 | Nakao |
| 7,586,489 B2 | 9/2009 | Muller-Fischer |
| 8,228,380 B2 | 7/2012 | Hardee et al. |
| 8,473,196 B2 | 6/2013 | Basnayake |
| 8,817,101 B2 | 8/2014 | Hanisch |
| 9,135,754 B2 | 9/2015 | Ng-Thow-Hing |
| 9,165,219 B2 | 10/2015 | Chen |
| 9,311,818 B2 | 4/2016 | Lin et al. |
| 9,324,201 B2 | 4/2016 | Jun |
| 9,424,725 B1 | 8/2016 | Keohane |
| 9,440,627 B2 | 9/2016 | Kurtovic et al. |
| 9,477,894 B1 | 10/2016 | Reed et al. |
| 9,547,912 B2 | 1/2017 | Kotz et al. |
| 9,558,667 B2 | 1/2017 | Bowers |
| 9,672,440 B2 | 6/2017 | Saward |
| 9,762,880 B2 | 9/2017 | Pflug |
| 9,784,887 B1 | 10/2017 | Ulmer |
| 9,813,619 B2 | 11/2017 | An |
| 9,928,544 B1 | 3/2018 | Hasan |
| 2002/0130953 A1 | 9/2002 | Riconda |
| 2003/0212567 A1 | 11/2003 | Shintani et al. |
| 2009/0231469 A1 | 9/2009 | Kato |
| 2011/0218896 A1 | 9/2011 | Tonnon |
| 2013/0103305 A1 | 4/2013 | Becker et al. |
| 2013/0342333 A1 | 12/2013 | Hutchings |
| 2014/0324247 A1 | 10/2014 | Jun |
| 2015/0054716 A1 | 2/2015 | Hirabayashi |
| 2015/0054934 A1 | 2/2015 | Haley |
| 2015/0134675 A1 | 5/2015 | Ellis |
| 2016/0153778 A1 | 6/2016 | Singh et al. |
| 2016/0325741 A1 | 11/2016 | Furst |
| 2016/0371968 A1 | 12/2016 | Almansour |
| 2017/0011378 A1 | 1/2017 | Inoue |
| 2017/0195564 A1 | 7/2017 | Appia |
| 2017/0261336 A1 | 9/2017 | Schmidt |
| 2017/0300761 A1 | 10/2017 | Chaney, Jr. et al. |
| 2017/0374502 A1 | 12/2017 | Gabel |
| 2018/0001814 A1 | 1/2018 | Salter |
| 2018/0027224 A1 | 1/2018 | Javidnia |
| 2018/0032829 A1 | 2/2018 | Kim |
| 2018/0219643 A1 | 8/2018 | Naka |
| 2018/0290594 A1 | 10/2018 | Abdel-Rahman |
| 2018/0321905 A1 | 11/2018 | Fountaine |
| 2019/0051056 A1* | 2/2019 | Chiu .................. G06K 9/00671 |
| 2019/0096086 A1* | 3/2019 | Xu .................... G06K 9/00208 |

FOREIGN PATENT DOCUMENTS

| | | |
|---|---|---|
| DE | 102016212181 A1 | 1/1918 |
| DE | 102009031319 A1 | 1/2011 |
| EP | 1462762 A1 | 9/2004 |
| JP | 2017068640 A | 4/1917 |
| JP | 2005005978 A | 1/2005 |
| JP | 2005209079 A | 8/2005 |
| KR | 101760312 B1 | 7/1917 |

OTHER PUBLICATIONS

Han, Xian-Feng et al., "A Review of Algorithms for Filtering the 3D Point Cloud," Signal Processing: Image Communication, pp. 103-112 2017, 10 pages.
Besl, Paul J., et al., A Method for Registration of 3-D Shapes, IEEE Trans. on Pattern Analysis and Machine Intelligence, 1992, 14 (2): 239-256, IEEE Computer Society: Los Alamitos, CA, USA, 18 pages.
Brailean, James C., et al., Noise Reduction filters for dynamic image sequences: A review, Proceedings of the IEEE, 1995, 83.9: 1272-1292, 21 pages.
Buades, Antoni, et al., Multi image noise estimation and denoising, 2010, 29 pages.
Carceroni, Rodrigo, et al., Structure from motion with known camera positions, Computer Vision and Pattern Recognition, 2006, IEEE Computer Society Conference on vol. 1, 10 pages.
Chen, H., et al., 3D free-form object recognition in range images using local surface patches, 2007, Pattern Recognition Letters, vol. 28, No. 10. 4 pages.
Chwa, Dongkyoung, et al., Camera motion estimation for 3-D structure reconstruction of moving objects, 2012 IEEE International Conference on Systems, Man, and Cybernetics (SMC), 6 pages.
Crandall, David J., et al. SfM with MRFs: Discrete-Continuous Optimization for Large-Scale Structure from Motion, IEEE Transactions on Pattern Analysis & Machine Intelligence, 2013, vol. 35, No. 12, 14 pages.
Dekeyser, Fabien, et al. Restoration of noisy, blurred, undersampled image sequences using a parametric motion model, 2000, Proc. of the ISIVC, 14 pages.
Dubois, Eric et al., Noise reduction in image sequences using motion-compensated temporal filtering, 1984, IEEE transactions on communications 32.7, 7 pages.
Nilosek, David et al., Assessing geoaccuracy of structure from motion point clouds from long-range image collections, Optical Engineering, 2014, 53.11, 11 pages.
Papazov, Chavdar, et al., An efficient ransac for 3d object recognition in noisy and occluded scenes, Asian Conference on Computer Vision, 2010, Springer, Berlin, Heidelberg, 14 pages.
Rosman, Guy, et al., Patch-Collaborative Spectral Point-Cloud Denoising, Computer Graphics Forum, 2013, vol. 32, No. 8, 12 pages.
Tombari, F., et al. Object recognition in 3D scenes with occlusions and clutter by Hough voting, 2010, 4th Pacific-Rim Symposium on Image and Video Technology, 7 pages.
Long, Jonathan et al., Fully Convolutional Networks for Semantic Segmentation, Mar. 2015, 10 pages.
Badrinarayanan, Vijay et al., SegNet: A Deep Convolutional Encoder-Decoder Architecture for Image Segmentation, Oct. 2016, 14 pages.
Yu, Fisher et al., Multi-Scale Context Aggregation by Dilated Convolutions, Apr. 2016, 13 pages.

(56) References Cited

OTHER PUBLICATIONS

Chen, Liang-Chieh et al., *DeepLab: Semantic Image Segmentation with Deep Convolutional Nets, Atrous Convolution, and Fully Connected CRFs,* May 2017, 14 pages.

Lin, Guosheng et al., *RefineNet: Multi-Path Refinement Networks for High-Resolution Semantic Segmentation,* Nov. 2016, 11 pages.

Zhao, Hengshuang et al., *Pyramid Scene Parsing Network,* Apr. 2017, 11 pages.

Peng Chao et al., *Large Kernel Matters—Improve Semantic Segmentation by Global Convolutional Network,* Mar. 2017, 11 pages.

Brostow, Gabriel J., Segmentation and Recognition using Structure from Motion Point Clouds, 2008, 14 pages.

Eigen, David et al., Depth Map Prediction From a Single Image Using a Multi-Scale Deep Network, 2014, 9 pages.

Finlayson, Graham, Detecting Illumination in Images, 2007, 8 pages.

Girdhar, Rohit et al., Learning a Predictable and Generative Vector Representation for Objects, Springer International Publishing, 2016, 26 pages.

Hui, Tak-Wai et al., Depth Map Super-Resolution by Deep Multi-Scale Guidance, Springer International Publishing, 2016, 17 pages.

Izadi, Shahram, KinectFusion: Real-Time 3D Reconstruction and Interaction Using a Moving Depth Camera, 2011, 10 pages.

Laskowski, Maciej, Detection of Light Sources in Digital Photographs, 2007, 6 pages.

Lin, Shu-Chin et al., Filling Holes in 3D Scanned Model Base on 2D Image Inpainting, 2017, 6 pages.

Marton, Zoltan Csaba, On Fast Surface Reconstruction Methods for Large and Noisy Point Clouds, 2009, 6 pages.

Nguyen, Anh, 3D Point Cloud Segmentation: A Survey, 2013, 6 pages.

Pauly, Mark, Efficient Simplification of Point-Sampled Surfaces, 2002, 8 pages.

Remondino, Fabio, From Point Cloud to Surface: The Modeling and Visualization Problem, 2003, 11 pages.

Xiang, Yu et al., ObjectNet3D: A Large Scale Database for 3D Object Recognition, 2016, 16 pages.

Zach, Christopher, Fast and High Quality Fusion of Depth Maps, 2008, 8 pages.

Zhang, Yiwei et al., A Fast 3D Reconstruction System With a Low-Cost Camera Accessory, 2015, 7 pages.

Zhu, Zhuotun et al., Deep Learning Representation using Autoencoder for 3D Shape Retrieval, 2016, 6 pages.

\* cited by examiner

INTER-VEHICLE COOPERATION FOR VEHICLE SELF HEIGHT ESTIMATION

TECHNICAL FIELD

The present disclosure generally relates to vehicle-to-vehicle communication and, more specifically, inter-vehicle cooperation for vehicle self height estimation.

BACKGROUND

Vehicles often traverse routes that have height limitations, such as underpasses, tunnels, and parking structures, etc. However, the height of a vehicle can be dynamic. For example, an operator may attach objects, such as a bike or a luggage rack, to the vehicle or attach a trailer to the vehicle. In such scenarios, the operator may forget that the vehicle is taller than normal (or, may not know what the height of the vehicle is the first place). Increasingly, vehicles and stationary infrastructure objects include cameras or other sensors (such as LiDAR, etc.) and are capable of communicating with vehicles through inter-vehicle communication. This inter-vehicle communication network is sometimes referred to as vehicle-to-vehicle (V2V) communication and vehicle-to-infrastructure (V2I) communication (sometimes referred to collectively as V2X communication).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for inter-vehicle cooperation for vehicle self height estimation. An example vehicle includes an inter-vehicle communication module and a body control module. The body control module broadcasts a request for images via the inter-vehicle communication module. The body control module also performs semantic segmentation on the images, generates a composite image of the vehicle based on the segmented images, and generates a three dimensional representation of the vehicle based on the composite image. Using the three dimensional representation, the body control module determines a height of the vehicle, and based on the height, controls the vehicle to avoid obstacles.

An example method includes broadcasting, via an inter-vehicle communication module, a request for images. The example method also includes performing semantic segmentation on the images received in response to the broadcasted request, generating a composite image of the vehicle based on the segmented images, and generating a three dimensional representation of the vehicle based on the composite image. Additionally, the example method includes using the three dimensional representation, determining a height of the vehicle, and autonomously controlling the vehicle to avoid infrastructure that have lower clearance requirements than the height of the vehicle along a current route of the vehicle.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
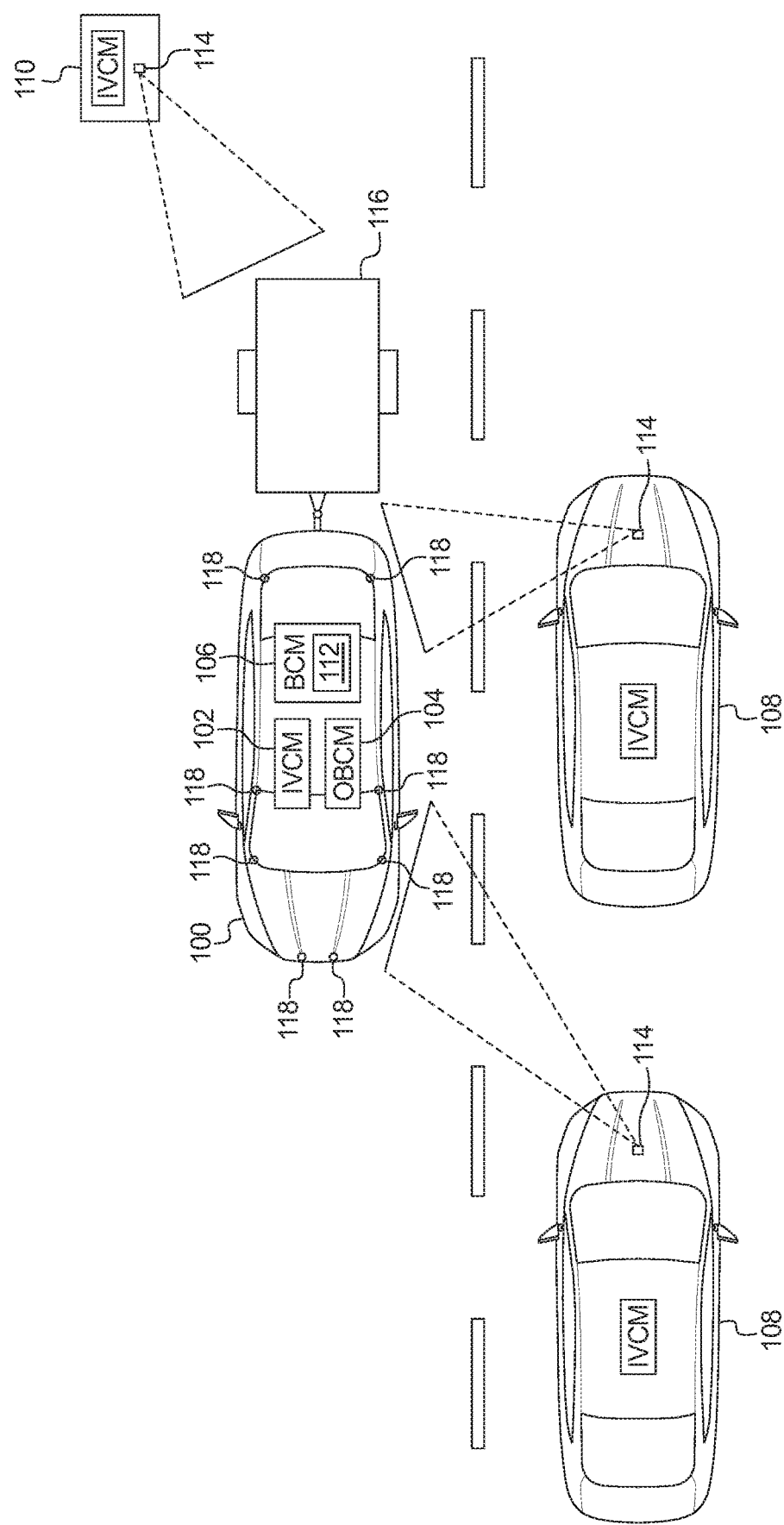
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

To plan routes, a vehicle uses information regarding height limitations along the route and height information regarding the vehicle. A vehicle detects upcoming structures with height limitations using techniques, such as image/sensors analysis from cameras and/or range detection sensors (e.g., radar, LiDAR, ultrasonic sensors, etc.), geographic database(s) and global positioning system (GPS) coordinates, and/or receiving height information of upcoming structures via inter-vehicle communication, etc. Determining a height of the vehicle is also important. However, techniques to determine the height of the vehicle often rely on the driver supplying relevant information. The driver may have wrong information or may forget that an action has changed the height of the vehicle. For example, the driver may forget to enter information into the vehicle after installing a luggage rack on the top of the vehicle.

Increasingly, vehicles and infrastructure objects (e.g., traffic signals, bridges, police surveillance pods, lamp posts, etc.) include inter-vehicle communication modules that facilitate communication between vehicles, infrastructure, and pedestrians. These vehicles and infrastructure objects also increasingly include and/or have 3rd party support for cameras (e.g., color cameras, monochrome cameras, time-of-flight cameras, stereo cameras, monocular cameras, etc.) and other sensors (e.g., LiDAR, etc.) available to capture images of nearby objects and vehicles.

As discussed below, from time-to-time (e.g., periodically, in response to an event, etc.), a vehicle (sometimes referred to as a "host vehicle") broadcasts a request for images and sensor data (e.g., radar data, LiDAR data, ultrasonic sensor data, etc.) from other vehicles (sometimes referred to as "target vehicles") and/or inter-vehicle communication enabled infrastructure modules (sometimes referred to as "roadside units") in the vicinity using an inter-vehicle communication module (sometimes referred to as a "vehicle-to-vehicle (V2V) module" or a "dedicated short range communication (DSRC) module"). The requests includes information that facilitates the target vehicles locating and/ or identifying the host vehicle so that the target vehicle can capture one or more images of the host vehicle. For example, the request may include the position, direction of travel, velocity, color, and/or model of the host vehicle, etc. As another example, the request may include an image or a set of feature points of or more portions of the vehicle to facilitate the target vehicles The host vehicle receives the images and the sensor data from the target vehicles. As the images are received, the host vehicle performs semantic segmentation to identify different objects (e.g., the host vehicle) and/or parts of objects (e.g., objects mounted to the host vehicle) in the images and progressively generates a composite image of the vehicle using a process of three-dimensional scene stitching, such as a structure from motion technique and/or sensor fusion. Using the segmentation information, the composite image, and a three dimensional model of the vehicle stored in memory, the vehicle constructs a three dimensional point cloud of the vehicle and any object attached to the vehicle. Sensor fusion combines sensor data (e.g., three-dimensional sensor data, such as from radar, LiDAR, ultra-sonic sensors, etc.) received from the target vehicles to further define the three dimensional structure of the host vehicle. Using a virtual camera to observe the point cloud, the vehicle estimates the height of the vehicle based and the angle of observation and the simulated location of the virtual camera. In some examples, the process of estimating the height of the vehicle is based on observations of multiple virtual cameras. Additionally, in some examples, other dimensions of the vehicle may be estimated with other simulated locations of virtual cameras.

The vehicle monitors the area around the vehicle for infrastructure that has a lower clearance than the estimated height of the vehicle. The obstacle may be in the immediate vicinity of the vehicle or may be along the currently planned route of the vehicle. When the vehicle detects an issue, it acts to ameliorate the issue. In some examples, the vehicle provides a warning to the operator. Alternatively or additionally, in some examples, the vehicle recalculates the route of the vehicle. In some examples, the vehicle autonomously acts to prevent the vehicle from encountering the infrastructure that has the lower clearance than the estimated height of the vehicle.

FIG. 1 illustrates a host vehicle 100 operating in accordance with this disclosure. The host vehicle 100 may be a standard gasoline powered vehicle, a hybrid vehicle, an electric vehicle, a fuel cell vehicle, and/or any other mobility implement type of vehicle. The host vehicle 100 may be any type of motor vehicle, such as a car, a truck, a semi-trailer truck, or a motorcycle, etc. Additionally, in some examples, the host vehicle 100 is towing a trailer (which, as discussed below, may be treated as part of the host vehicle 100) which may, for example, include other objects, such as boats, horses, lawn equipment, etc. The host vehicle 100 includes parts related to mobility, such as a powertrain with an engine, a transmission, a suspension, a driveshaft, and/or wheels, etc. The host vehicle 100 may be non-autonomous, semi-autonomous (e.g., some routine motive functions controlled by the host vehicle 100), or autonomous (e.g., motive functions are controlled by the host vehicle 100 without direct driver input). The vehicle may be stationary or in motion during image capture. In the illustrated example the host vehicle 100 includes an inter-vehicle communication module (IVCM) 102, an on-board communication module (OBCM) 104, and a body control module (BCM) 106.

The inter-vehicle communication module 102 includes antenna(s), radio(s) and software to broadcast messages and to establish communication between the host vehicle 100 and target vehicles 108, roadside units 110, and mobile device-based modules (not shown). More information on the inter-vehicle communication network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-Jun.-13).pdf), which is hereby incorporated by reference in its entirety along with all of the documents referenced on pages 11 to 14 of the SyRS report. The inter-vehicle communication systems may be installed on vehicles and along roadsides on infrastructure. The inter-vehicle communication systems incorporated into infrastructure (e.g., traffic signals, street lights, municipal cameras, etc.) is known as a "roadside" system or unit, inter-vehicle communication may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems, inter-vehicle communication systems can be integrated with other systems such as mobile phones.

In some examples, the inter-vehicle communication module 102 implements the Dedicated Short Range Communication (DSRC) protocol. Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The on-board communications module 104 includes wired or wireless network interfaces to enable communication with external networks. The on-board communications module 104 includes hardware (e.g., processors, memory, storage, antenna, etc.) and software to control the wired or wireless network interfaces. In the illustrated example, the on-board communications module 104 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); local area wireless network (including IEEE 802.11 a/b/g/n/ac or others), and Wireless Gigabit (IEEE 802.11ad), etc.). In some examples, the on-board communications module 104 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, the host vehicle 100 may communicated with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols. In some examples, the host vehicle 100 communicates with an external server, via the on-board communications module 104 to receive information regarding height limitations of infrastructure near a current location of the host vehicle 100 and/or along a current route of the host vehicle 100.

The body control module 106 controls various subsystems of the host vehicle 100. For example, the body control module 106 may control power windows, power locks, an immobilizer system, and/or power mirrors, etc. The body control module 106 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In the illustrated example, the body control module 106 includes a height detector 112. Alternatively, in some examples, the height detector 112 may incorporated into another vehicle module, such as an infotainment head unit or an autonomy unit that controls autonomous functions of the vehicle.

The height detector 112 estimates the height of the host vehicle 100 and any attached object using images and/or data receives from the target vehicles 108 and/or the roadside units 110. From time-to-time, the height detector 112 (a) determines a geo-spatial orientation of the host vehicle 100 used to facilitate the target vehicles 108 and/or roadside units 110 determining the relative location of the host vehicle 100 compared to their location and (b) broadcasts a request message using the inter-vehicle communication module 102. In some examples, the height detector 112 sends the request periodically (e.g., hourly, daily, etc.) or in response to an event (e.g., every key cycle, entry into a densely populated area, etc.). Alternatively or additionally, in some examples, the height detector 112 sends the request message in response to detecting changes in the status of the host vehicle 100. For example, the height detector 112 may detect a change in the total gross weight, changes to vehicle dynamics, and/or a hookup to a trailer 116.

The request message requests that the target vehicles 108 and/or roadside units 110 in the vicinity capture images and/or sensor data of the host vehicle 100 with their cameras 114 (e.g., color cameras, monochrome cameras, time-of-flight cameras, stereo cameras, monocular cameras, etc.) and/or their range detection sensors (e.g., radar, LiDAR, ultrasonic sensors, etc.). The request message includes information regarding the geo-spatial orientation of the host vehicle 100. The geo-spatial orientation information includes the location (e.g., global positioning system (GPS) coordinates, etc.), orientation (e.g., the orientation that the front of the host vehicle 100 is pointed towards, etc.), and/or characteristics (e.g., color, make, model, etc.) that facilitates the target vehicles 108 and/or the roadside units locating and identifying the host vehicle 100. For example, the geo-spatial orientation information for the host vehicle 100 may include GPS coordinates, a direction of travel, and a vehicle color. In some examples, the geo-spatial orientation information also includes information about objects in the vicinity of the host vehicle 100 that can act as landmarks to further facilitate the target vehicles 108 and/or roadside units 110 locating the host vehicle 100. In some such examples, the objects are detected by the height detector 112 via radar and/or LiDAR. Alternatively or additionally, in some examples, the height detector 112 uses the GPS coordinates of the host vehicle 100 to analyze navigation data (e.g., maps, etc.) to determine which objects are near the host vehicle 100.

To estimate the height, the height detector 112 performs semantic segmentation on received the images, generates a composite image using the received images, and generates a three dimensional representation of the host vehicle 100 using the semantic segmentation, the composite image, and a model of the host vehicle 100 stored in memory.

Semantic segmentation is an image classification technique that assigns pixels of an image to different constituent parts. For example, the height detector 112 may identify portions of an image that are associated with the host vehicle 100, the trailer 116, a luggage rack, bicycles, other vehicles, pedestrians, foliage, etc. To perform semantic segmentation, the height detector 112 uses techniques such as convolutional neural networks (e.g., fully convolutional networks (FCN), dilated convolutions, encoder-decoder convolutions, deep convolutional neural networks with fully connected conditional random fields, etc.). Example techniques to perform semantic segmentation are described by (a) Zhao et al. in "Pyramid Scene Parsing Network," 2017 *IEEE Conference on Computer Vision and Pattern Recognition (CVPR)*; (b) Long et al. in "Fully Convolutional Networks for Semantic Segmentation," 2015 *IEEE Conference on Computer Vision and Pattern Recognition (CVPR)*; (c) Badrinarayanan et al. in "SegNet: A Deep Convolutional Encoder-Decoder Architecture for Image Segmentation," *IEEE Transactions on Pattern Analysis and Machine Intelligence*, vol. 39, no. 12, January 2017, pp. 2481-2495; (d) Yu et al. in "Multi-Scale Context Aggregation by Dilated Convolutions," 2015;(e) Chen et al. in "DeepLab: Semantic Image Segmentation with Deep Convolutional Nets, Atrous Convolution, and Fully Connected CRFs," *IEEE Transactions on Pattern Analysis and Machine Intelligence*, 2017; Lin et al. in "RefineNet: Multi-Path Refinement Networks for High-Resolution Semantic Segmentation," 2017 *IEEE Conference on Computer Vision and Pattern Recognition (CVPR)*; and (f) Peng, Chao, et al. "Large Kernel Matters—Improve Semantic Segmentation by Global Convolutional Network," 2017 *IEEE Conference on Computer Vision and Pattern Recognition (CVPR)*, which are herein incorporated by reference in their entirety The height detector 112 uses structure from motion to construct a two-dimensional or three dimensional composite image of the host vehicle 100 using the received images. In some examples, the height detector 112 uses the results of the semantic segmentation of the received images to remove objects in the images that are not related to the host vehicle 100 and/or change over time. Using a structure of motion technique, feature points 118 of the host vehicle 100 are identified in the received images. The height detector 112 uses the positioning of the feature points and a three dimensional model of the host vehicle 100 to stitch at least portions of the images together to create the composite image of the host vehicle 100. Example structure from motion techniques are described in Crandall, David J., et al. "SfM with MRFs: Discrete-continuous optimization for large-scale structure from motion," *IEEE transactions on pattern analysis and machine intelligence* 35.12 (2013): 2841-2853, which is herein incorporated by reference in its entirety.

Using the composite image, range detection sensor data from the target vehicles 108, a model of the host vehicle 100 stored in memory, the height detector 112 detects a three dimensional model of the host vehicle 100 that represents the current state of the host vehicle 100 and objects (e.g., bicycles, luggage racks, trailers, etc.) attached to the host vehicle 100. The height detector 112 generates a three dimensional point cloud of the host vehicle 100 by removing outlier pixels from the three dimensional model using a statistical analysis technique., such as K neighbor distances. Because the host vehicle 100 may have other objects attached, in some examples, the height detector 112 uses the semantic segmentation information to generate the point cloud for the host vehicle 100 and a point cloud for the other object(s). In some such examples, the proportions of the point cloud are calibrated based on the model of the host vehicle 100 in memory, and the point cloud(s) for the other object(s) is/are scaled to correspond to the calibration. In some examples, the height detector 112 converts the point cloud(s) into a mesh model. The model of the host vehicle 100 stored in memory may also be used to supplement information in the point cloud that is unavailable from the composite image because, for example, the cameras 114 of the target vehicles 108 and/or the roadside units 110 may not be able to capture certain angles of the host vehicle 100.

Figure 2:
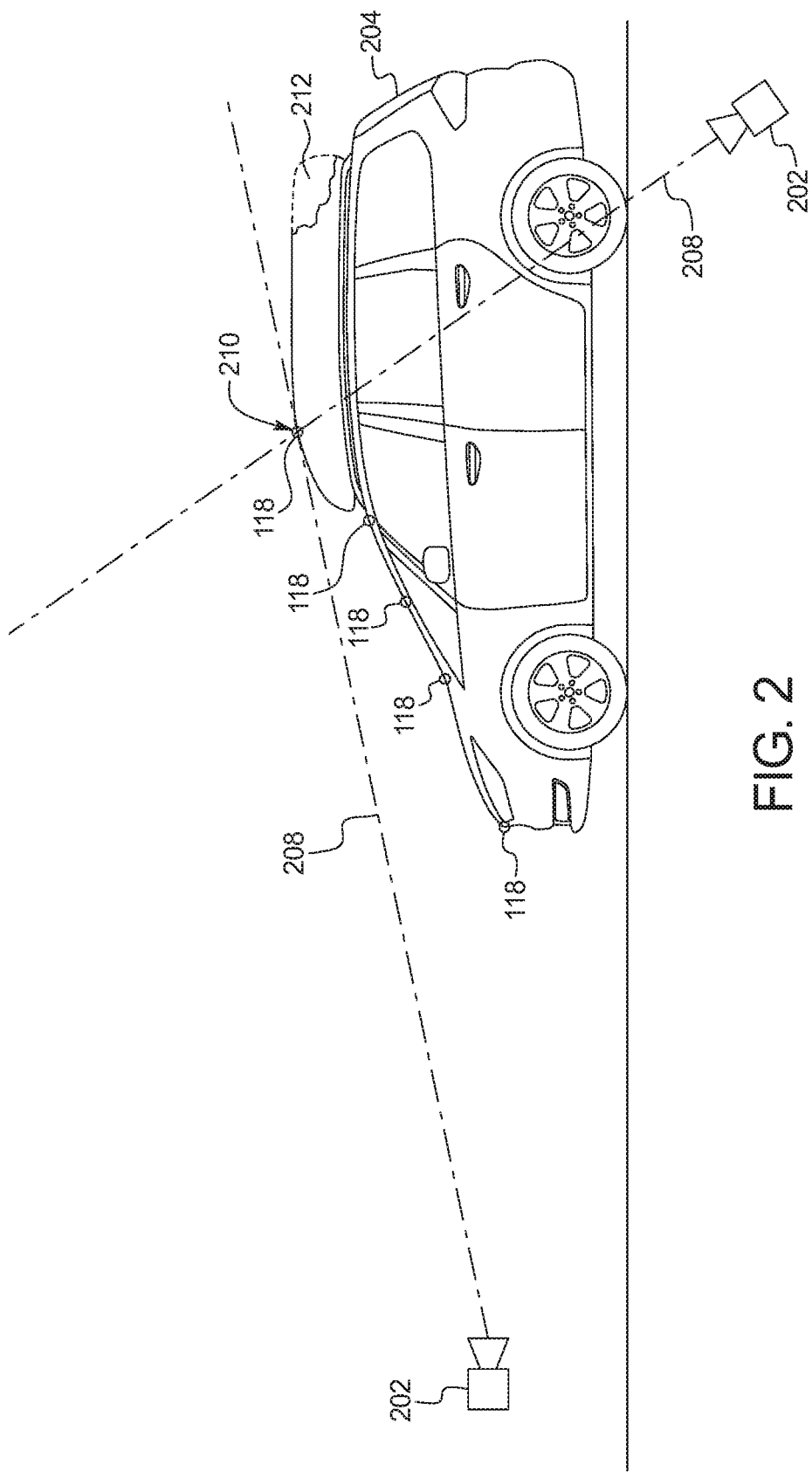
FIG. 2 illustrates a virtual camera estimating a height of the vehicle of FIG. 1.

As illustrated in FIG. 2, the height detector 112 establishes one or more virtual cameras 202 that represent view(s) of the three dimensional composite image/point cloud/mesh model 204 at a distance and angle of observation (.theta..sub.O) from the host vehicle 100. In some examples, the distance and angle of observation (.theta..sub.O) based on the three dimensional model of the host vehicle 100 with reference to the feature points 118 in the received images. The top most feature point 118 indicates the highest detectable feature from the received images. As more images are received with perspectives of different heights and different angles, the top most feature point 118 may change. Such as change causes the height detector 112 to recalculate the height of the host vehicle 100. As such, the height detector 112 may continually update the estimated height of the host vehicle 100 as more images become available. The height detector 112 selects the angle of observation (.theta..sub.O) to be the view angle to be the angle at which the virtual camera's perspective 208 clears the top edge 210 of the host vehicle 100 with respect to the ground plane of the road. To determine the height of the host vehicle 100, the height detector 112 calculates a sine of the angle of observation (.theta..sub.O) over the host vehicle 100 relative to the ground plane of the road multiplied by a vehicle length in the perspective of the virtual camera. In some examples, the height detector 112 uses multiple positions of the virtual camera to determine the height of the host vehicle 100. In some examples, the height detector 112 detects the length and/or width of the host vehicle 100 by using a viewing angle and feature points associated with side edges of the host vehicle 100. Some surfaces, such as the surface 212, cannot be substantiated because of the environment around the host vehicle 100 and/or how the host vehicle 100 is currently parked. For example, with the object attached to the host vehicle 100, the height detector 112 may not be able to construct a portion of the point cloud to represent the missing surface 212. In some example examples, the height detector 112 provides an alert that the height estimate may not be complete because a portion of the attached object cannot be modeled in the point cloud (e.g., a taller surface may be present on the missing surface). Alternatively or additionally, in some examples, the height detector 112 may extrapolate the shape of the missing surface 212 based on the point cloud.

The height detector 112 stores the estimated height in memory and autonomously acts to ameliorate potential height clearance issues on the current route of the host vehicle 100. In some examples, the height detector 112 provides a visual, audio, and/or haptic warning to the operator of the host vehicle 100. In some examples, the height detector 112 instructs a navigation system to alter the route of the host vehicle 100. In some examples, the height detector 112 controls the motive functions (e.g., steering, acceleration, etc.) of the host vehicle 100 to prevent the host vehicle 100 from traversing an area where the host vehicle 100 is taller than the height limitations of the infrastructure. Alternatively or additionally, in some examples, the height detector 112 adjusts the height of the host vehicle 100 through (a) an active suspension that adjusts pressure from shocks and/or struts to change the height of the host vehicle 100 and/or (b) an active tire pressure system that facilitates an autonomous reduction of tire pressure (e.g., through a electronically controlled valve) to decrease the height of the host vehicle 100.

Figure 3:
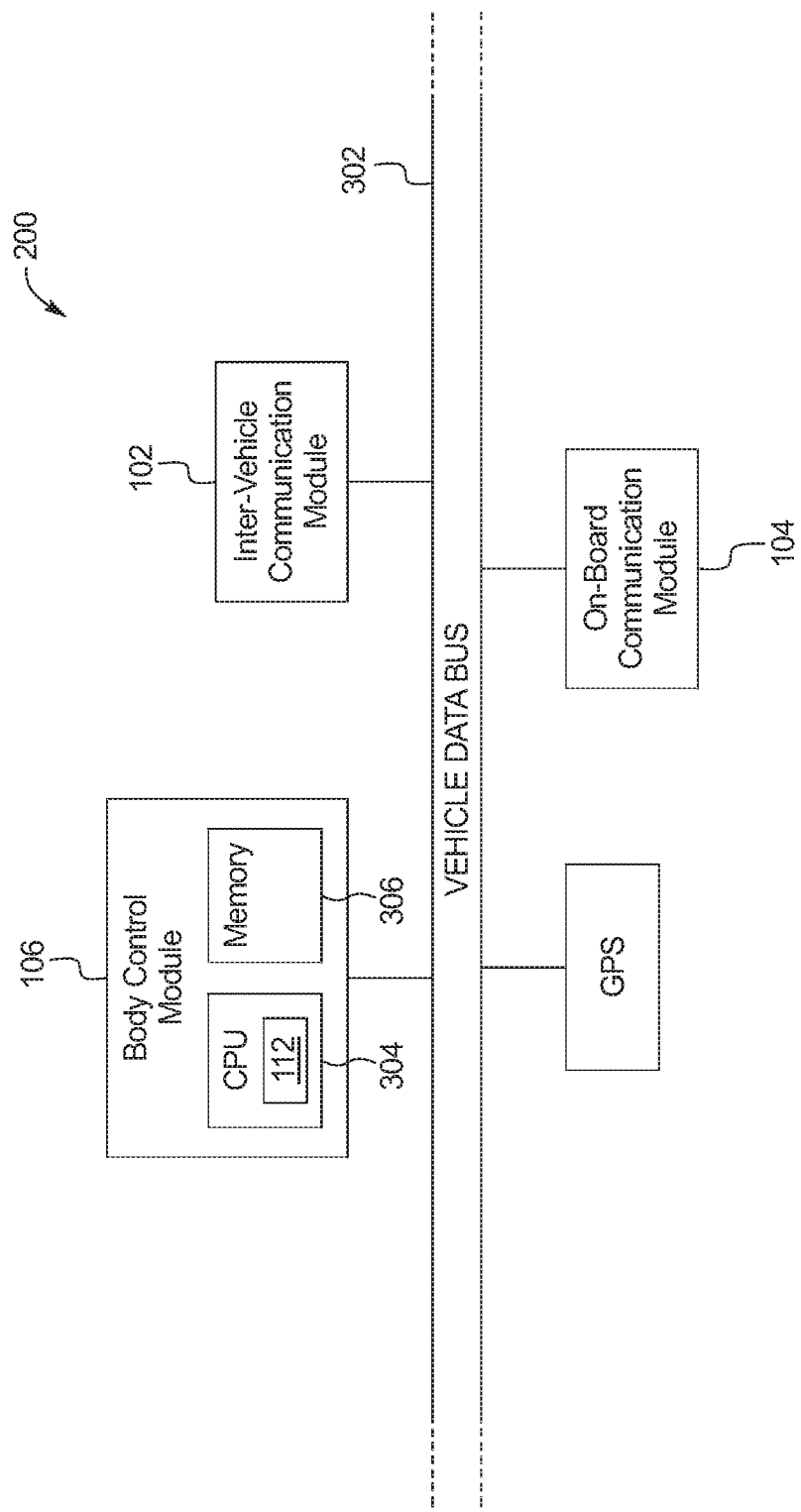
FIG. 3 is a block diagram of electronic components of the vehicle of FIGS. 1.

FIG. 3 is a block diagram of electronic components 300 of the host vehicle 100 of FIG. 1. In the illustrated example, the electronic components 300 include the inter-vehicle communication module 102, the on-board communications module 104, the body control module 106, and a vehicle data bus 302.

In the illustrated example, the body control module 106 includes a processor or controller 304 and memory 306. In the illustrated example, the body control module 106 is structured to include height detector 112. Alternatively, in some examples, the height detector 112 may be incorporated into another electronic control unit (ECU) with its own processor and memory (such as an infotainment head unit, etc.). The processor or controller 304 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 306 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 306 includes multiple kinds of memory, particularly volatile memory and non-volatile memory.

The memory 306 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 306, the computer readable medium, and/or within the processor 304 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 302 communicatively couples the inter-vehicle communication module 102, the on-board communications module 104, and the body control module 106. In some examples, the vehicle data bus 302 includes one or more data buses. The vehicle data bus 302 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
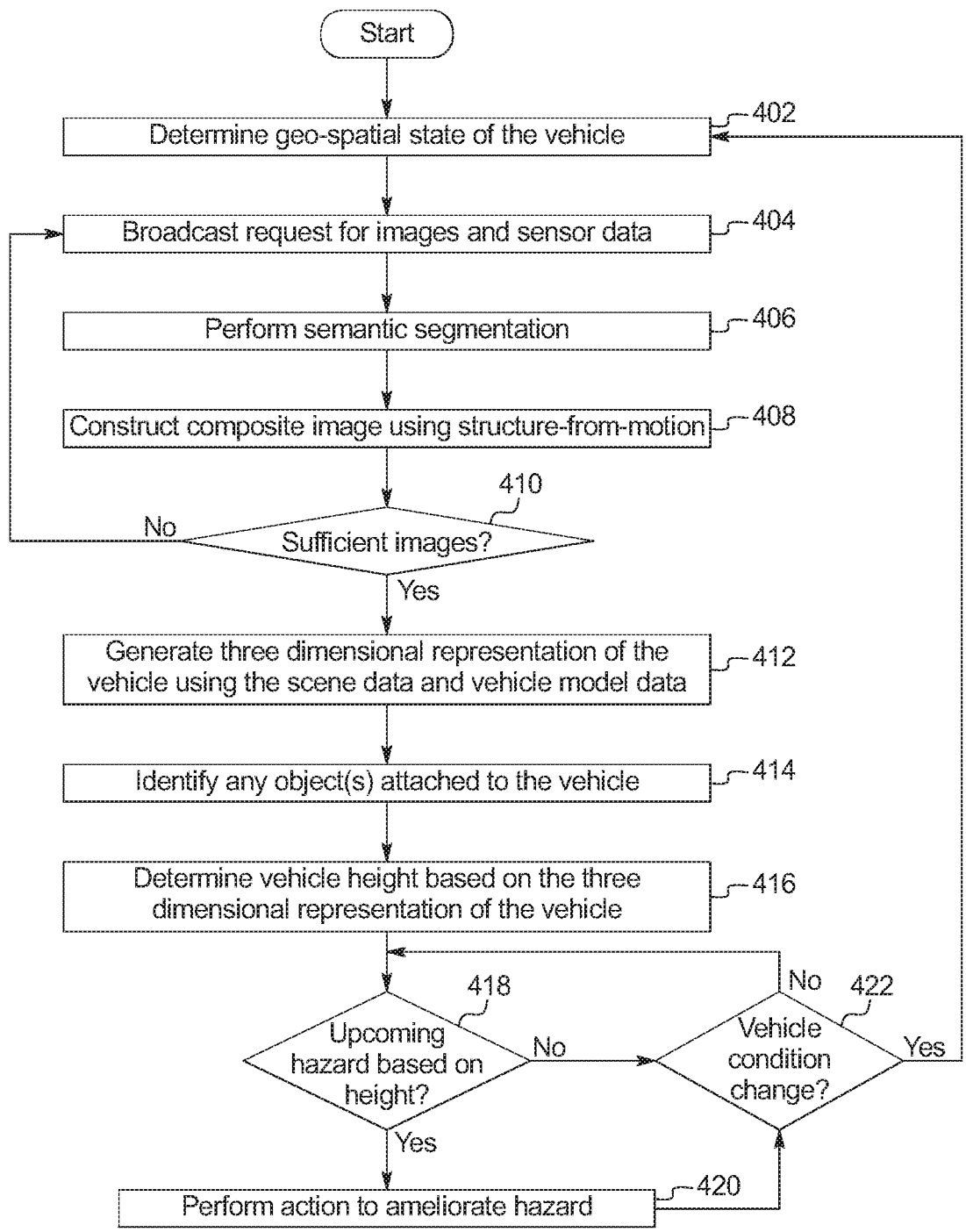
FIG. 4 is a flowchart of a method to estimate a height of the vehicle using images received via inter-vehicle communication, which may be implemented by the electronic components of FIG. 3.

FIG. 4 is a flowchart of a method to estimate a height of the host vehicle 100 using images received via inter-vehicle communication, which may be implemented by the electronic components 300 of FIG. 3. The method starts when an event (e.g., time-based event, a change in a status of the host vehicle 100, etc.) triggers the host vehicle 100 to determine the height of the host vehicle 100. Initially, at block 402, the height detector 112 determines the geo-spatial state of the host vehicle 100. For example, the height detector 112 may determine the GPS coordinates of the host vehicle 100, and the orientation of the host vehicle 100. Additionally, the information included in the geo-spatial state of the host vehicle 100 also includes other information to facilitate locating the host vehicle 100, such as the color of the host vehicle 100 or the license plate number of the host vehicle 100, etc. At block 404, the height detector 112 broadcasts a request for target vehicles 108 and/or roadside units 110 to capture images of the host vehicle 100. The request includes the information regarding the geo-spatial state of the host vehicle 100 and other information to facilitate locating the host vehicle 100 in order to capture images of the host vehicle 100.

At block 406, the height detector 112 performs semantic segmentation on the images from the target vehicles 108 and/or the roadside units 110 to identify pixels corresponding to the host vehicle 100 and associated objects (e.g., trailers, luggage racks, bicycles, etc.) within the images. As the height detector 112 receives images, the height detector 112 identifies the host vehicle 100 in the images so that the height detector 112 has representations of the host vehicle from different angles and distances. At block 408, the height detector 112 constructs a three dimensional composite image of host vehicle 100 using structure from motion techniques. At block 410, the height detector 112 determines whether a sufficient number of images have been received to construct a composite image that can be used to determine the height of the host vehicle 100. For example, the height detector 112 may determine what percentage of the host vehicle 100 is recreated in the composite image or may determine whether the composite image includes a portion of the host vehicle 100 that provides a view of the height of the host vehicle 100. When a sufficient number of images have been received, the method continues at block 412. Otherwise, when a sufficient number of images have not been received, the method returns to block 406.

At block 412, the height detector 112 constructs a three dimensional representation of the host vehicle 100 using the composite image, range detection sensor data from the target vehicle(s) 108, and/or a three dimensional model of the host vehicle 100 stored in memory (e.g., the memory 306 of FIG. 3 above). To generate the representation, the height detector 112 filters and/or scales the constituent parts (e.g., the host vehicle 100 and the objects affixed to it). In some examples, the three dimensional representation is a point cloud or a mesh model. In some examples, the height detector 112 performs sensor fusion to generate the point cloud of the mesh model. In such examples, the three dimensional data from the sensor data received from the target vehicles 108 is used to construct and/or filter the point cloud. In some examples, the three dimensional sensor data is combined with the point cloud generated using the images using a random consensus model (RANSAC) technique. At block 414, the height detector 112 distinguishes the host vehicle 100 from the affixed objects in the three dimensional representation. At block 416, the height detector 112 determines the height of the host vehicle 100 based on the three dimensional representation. At block 418, the height detector 112 determines whether an obstacle that has a height limit that is lower than the height determined at block 416 along the current route of the host vehicle 100. For example, the height detector 112 may analyze navigation data and/or receive broadcasts via the inter-vehicle communication module 102 from roadside units 110 that indicates the clearance heights of infrastructure in the vicinity of the host vehicle 100. When there such an obstacle, the method continues at block 420. Otherwise, when there is not such an obstacle, the method continues at block 422.

At block 420, the height detector 112 performs one or more actions to react to the upcoming obstacle. In some examples, the height detector 112 provides an visual, audible, and/or haptic alert to the operator of the host vehicle 100. In some examples, the height detector 112 autonomously instructs the navigation system to change the current route of the host vehicle 100 to avoid the obstacle. In some examples, the height detector 112 autonomously controls one or more of the motive functions of the host vehicle 100 to prevent the host vehicle 100 from encountering the obstacle. At block 422, the height detector 112 determines whether the condition of the host vehicle 100 has changed. For example, the condition of the host vehicle 100 may change when on a key cycle. As another example, the condition of the host vehicle 100 may change when the trailer 116 is connected and/or when sensors of the host vehicle 100 detect indicia that the height of the host vehicle 100 may have changed. When the condition of the host vehicle 100 has changed, the method returns to block 402. Otherwise, when the condition of the host vehicle 100 has not changed, the method returns to block 418.

The flowchart of FIG. 4 is representative of machine readable instructions stored in memory (such as the memory 306 of FIG. 3) that comprise one or more programs that, when executed by a processor (such as the processor 304 of FIG. 3), cause the host vehicle 100 to implement the example height detector 112 of FIGS. 1 and 3. Further, although the example program(s) is/are described with reference to the flowchart illustrated in FIG. 4, many other methods of implementing the example height detector 112 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
an inter-vehicle communication module; and
a body control module to:
broadcast a request for images via the inter-vehicle communication module;
perform semantic segmentation on the images;
generate a composite image of the vehicle based on the segmented images;
generate a three dimensional representation of the vehicle based on the composite image;
using the three dimensional representation, determine a height of the vehicle;
based on the height, control the vehicle to avoid obstacles.

2. The vehicle of claim 1, wherein the request includes geo-spatial information regarding the vehicle to facilitate recipients of the request to locate the vehicle.

3. The vehicle of claim 2, wherein the geo-spatial information includes coordinates of the vehicle, an orientation of the vehicle, and at least one of a color of the vehicle or a model of the vehicle.

4. The vehicle of claim 1, wherein the three dimensional representation is a point cloud based on the composite image and a three dimensional model of the vehicle stored in memory of the vehicle.

5. The vehicle of claim 4, wherein to determine the height of the vehicle, the body control module is to:
establish a virtual camera in relation to the three dimensional representation; and
calculate the height based on a viewing angle of the virtual camera, the viewing angle being an angle at which a perspective of the virtual camera clears a top edge of the three dimensional representation with respective to a ground plane of a road.

6. The vehicle of claim 1, wherein the three dimensional representation is a mesh model based on a point cloud generated using the composite image and a three dimensional model of the vehicle stored in memory of the vehicle.

7. The vehicle of claim 1, wherein the obstacles are infrastructure that have a lower clearance requirement than the height of the vehicle along a current route of the vehicle.

8. The vehicle of claim 1, wherein to avoid the obstacles, the body control module is to instruct a navigation system to change a route of the vehicle.

9. The vehicle of claim 1, wherein to avoid the obstacles, the body control module is to autonomously control motive functions of the vehicle to prevent the vehicle from encountering the obstacles.

10. A method comprising:
broadcast, via an inter-vehicle communication module, a request for images;
performing, with a processor of a vehicle, semantic segmentation on the images received in response to the broadcasted request;
generating a composite image of the vehicle based on the segmented images;
generating a three dimensional representation of the vehicle based on the composite image;
using the three dimensional representation, determining a height of the vehicle;
autonomously controlling the vehicle to avoid infrastructure that have lower clearance requirements than the height of the vehicle along a current route of the vehicle.

11. The method of claim 10, wherein the request includes geo-spatial information regarding the vehicle to facilitate recipients of the request to locate the vehicle.

12. The method of claim 11, wherein the geo-spatial information includes coordinates of the vehicle, an orientation of the vehicle, and at least one of a color of the vehicle or a model of the vehicle.

13. The method of claim 10, wherein the three dimensional representation is a point cloud based on the composite image and a three dimensional model of the vehicle stored in memory of the vehicle.

14. The method of claim 13, wherein to determining the height of the vehicle includes:
establishing a virtual camera in relation to the three dimensional representation; and
calculating the height based on a viewing angle of the virtual camera, the viewing angle being an angle at which a perspective of the virtual camera clears a top edge of the three dimensional representation with respective to a ground plane of a road.

15. The method of claim 10, wherein the three dimensional representation is a mesh model based on a point cloud generated using the composite image and a three dimensional model of the vehicle stored in memory of the vehicle.

16. The method of claim 10, including, in response to detecting the infrastructure that has the lower clearance requirement than the height of the vehicle along the current route of the vehicle, lowering the height of the vehicle using at least one of an active suspension system or an active tire pressure system.

* * * * *